United States Patent
Kusuyama

(10) Patent No.: US 11,784,544 B2
(45) Date of Patent: Oct. 10, 2023

(54) METHOD OF MANUFACTURING LAMINATED STEEL PLATE

(71) Applicant: THREEBOND CO., LTD., Tokyo (JP)

(72) Inventor: Aki Kusuyama, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 428 days.

(21) Appl. No.: 16/615,237

(22) PCT Filed: May 16, 2018

(86) PCT No.: PCT/JP2018/018912
§ 371 (c)(1),
(2) Date: Nov. 20, 2019

(87) PCT Pub. No.: WO2018/216565
PCT Pub. Date: Nov. 29, 2018

(65) Prior Publication Data
US 2020/0186014 A1    Jun. 11, 2020

(30) Foreign Application Priority Data

May 23, 2017 (JP) ................. 2017-101758

(51) Int. Cl.
*H02K 15/02* (2006.01)
*B21D 28/26* (2006.01)
*C09J 4/00* (2006.01)

(52) U.S. Cl.
CPC ............ *H02K 15/02* (2013.01); *B21D 28/26* (2013.01); *C09J 4/00* (2013.01)

(58) Field of Classification Search
CPC ............ C08F 222/102; C08F 220/1811; C08F 222/103; C08F 220/1805; C09J 4/00;
(Continued)

(56) References Cited

U.S. PATENT DOCUMENTS

| | | | | |
|---|---|---|---|---|
| 4,608,297 A | * | 8/1986 | Shimada | B82Y 25/00 360/125.01 |
| 6,184,264 B1 | * | 2/2001 | Webster | C09J 133/062 522/182 |
| 2020/0186014 A1 | * | 6/2020 | Kusuyama | B32B 15/01 |

FOREIGN PATENT DOCUMENTS

| | | |
|---|---|---|
| CN | 103745798 A | 4/2014 |
| JP | H11512134 A * | 10/1999 |

(Continued)

OTHER PUBLICATIONS

Office Action dated Jan. 29, 2022 in Chinese Patent Application No. 201880030683.1 (with English translation); 14 pgs.
(Continued)

*Primary Examiner* — Minh N Trinh
(74) *Attorney, Agent, or Firm* — Maier & Maier, PLLC

(57) ABSTRACT

A method of manufacturing a laminated steel plate capable of simplifying the manufacturing process. This is achieved by a method of manufacturing a laminated steel plate including a step of applying a mixture containing an oil and an adhesive composition for a laminated steel plate including at least one kind of a (meth)acrylate compound compatible with the oil and an organic peroxide to one side or both sides of a strip-like steel plate; and a step of punching a steel plate body from the strip-like steel plate with a punch portion of a press forming device, and laminating and bonding the steel plate bodies.

8 Claims, 1 Drawing Sheet

(58) Field of Classification Search
CPC .......... C09J 11/06; B21D 28/02; B32B 37/18; H02K 15/02
See application file for complete search history.

(56) References Cited

FOREIGN PATENT DOCUMENTS

| | | |
|---|---|---|
| JP | 2000-152570 A | 5/2000 |
| JP | 2001-321850 A | 11/2001 |
| JP | 2006-334648 A | 12/2006 |
| JP | 2007-217484 A | 8/2007 |

OTHER PUBLICATIONS

Extended European Search Report dated Feb. 15, 2021, in connection with EP Application No. 18806601.3; 7 pages.
Office Action dated Mar. 18, 2022 in Japanese Patent Application No. 2019-519596 (with English translation); 10 pages.
International Search Report with English translation and Written Opinion dated Jul. 24, 2018 and Corrected Written Opinion dated Sep. 10, 2019 in corresponding International Application No. PCT/JP2018/018912; 13 pages.
Chinese Office Action dated May 6, 2021, in connection with corresponding CN Application No. 201880030683.1 (17 pp., including machine-generated English translation).
The Third Office Action dated Jul. 27, 2022, in corresponding to Chinese Application No. 201880030683.1; 8 pages (with English Translation).

\* cited by examiner

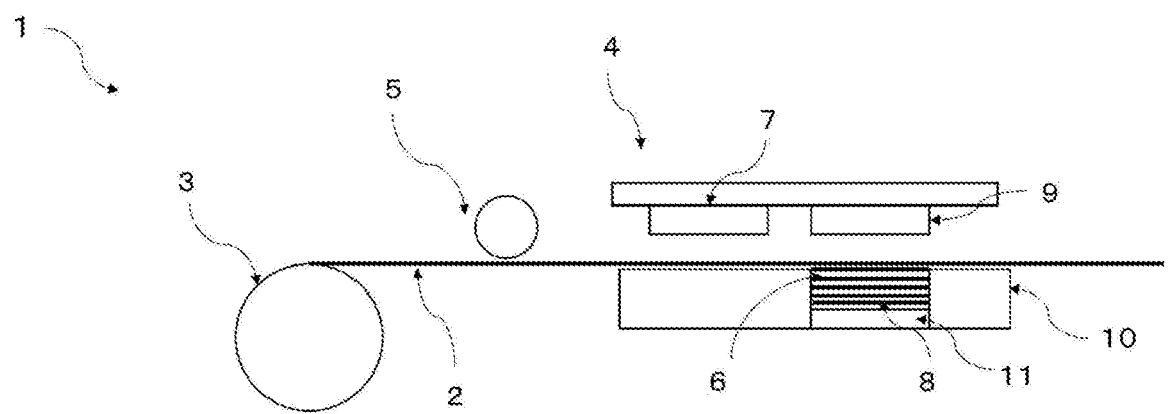

METHOD OF MANUFACTURING LAMINATED STEEL PLATE

TECHNICAL FIELD

The present invention relates to a method of manufacturing a laminated steel plate, a laminated steel plate, a motor, and an adhesive composition for a laminated steel plate (hereinafter, also simply referred to as adhesive composition).

BACKGROUND ART

Currently, motors are used in a wide range of applications, such as mobile phone vibration, camera focus adjustment, hard disk drive, and automobile drive. The rotor and stator of the motor are made of laminated steel plates formed by laminating a number of electromagnetic steel plates. The laminated steel plates are generally laminated by caulking. However, with the miniaturization of motors, there is an increasing need for further thinning of laminated steel plates, and stress concentration and strain concentration due to mechanical fastening have become problems. From such a circumstance, lamination boding has attracted attention as a method that can disperse stress on the surface.

JP 2001-321850 A discloses a method of manufacturing a lamination-bonded body in which an adhesive is applied to the surface of a strip-like steel plate and electromagnetic steel plates are laminated simultaneously with punching using a press forming machine.

SUMMARY OF INVENTION

However, in the lamination boding method of JP 2001-321850 A, there is a problem that the process becomes complicated because it is necessary to apply an adhesive after removing a punching oil applied to the strip-like steel plate.

In this regard, the present invention is made in consideration of the above circumstance, and an object thereof is to provide a method of manufacturing a laminated steel plate which can simplify manufacturing process, without impairing an adhesion force of an adhesive.

The present invention has the following gist.

[1] A method of manufacturing a laminated steel plate including: a step 1 of applying a mixture containing an oil and an adhesive composition for a laminated steel plate to one side or both sides of a strip-like steel plate; and a step 2 of punching a steel plate body from the strip-like steel plate with a punch portion of a press forming device, and laminating and bonding the steel plate bodies.
[2] The method of manufacturing a laminated steel plate according to [1], wherein the adhesive composition contains at least one kind of a (meth)acrylate compound and an organic peroxide.
[3] The method of manufacturing a laminated steel plate according to [2], wherein the (meth)acrylate compound contains at least one kind of a (meth)acrylate compound compatible with the oil.
[4] The method of manufacturing a laminated steel plate according to [2] or [3], wherein the (meth)acrylate compound contains at least one compound selected from the group consisting of an aliphatic (meth)acrylate and an alicyclic (meth)acrylate.
[5] The method of manufacturing a laminated steel plate according to any one of [1] to [4], wherein the mixture contains 3 to 100 parts by mass of the oil per 100 parts by mass of the adhesive composition.
[6] The method of manufacturing a laminated steel plate according to any one of [1] to [5], wherein the adhesive composition is an adhesive composition which is curable by heating.
[7] The method of manufacturing a laminated steel plate according to any one of [1] to [6], wherein the laminated steel plate is used for a rotor or a stator of a motor.
[8] A laminated steel plate obtained by the manufacturing method set forth in any one of the above [1] to [7].
[9] A motor using the laminated steel plate set forth in the above [8].
[10] An adhesive composition for a laminated steel plate used in a method of manufacturing a laminated steel plate, wherein the method of manufacturing the laminated steel plate includes:
a step 1 of applying a mixture containing an oil and an adhesive composition for a laminated steel plate to one side or both sides of a strip-like steel plate; and
a step 2 of punching a steel plate body from the strip-like steel plate with a punch portion of a press forming device, and laminating and bonding the steel plate bodies, and
the adhesive composition for a laminated steel plate contains a (meth)acrylate compound.
[11] The adhesive composition for a laminated steel plate according to [10], wherein the adhesive composition further includes an organic peroxide.

BRIEF DESCRIPTION OF DRAWINGS

FIG. 1 is a schematic view of an apparatus for manufacturing a laminated steel plate according to an embodiment of the present invention.

DETAILED DESCRIPTION OF EMBODIMENTS

The details of the invention are described below. FIG. 1 is a schematic view of an apparatus for manufacturing a laminated steel plate according to an embodiment. Note that, the following description does not limit the technical scope or the meaning of terms described in the claims.

The method of manufacturing a laminated steel plate of the present invention includes a step 1 of applying a mixture containing an oil and an adhesive composition for a laminated steel plate to one side or both sides of a strip-like steel plate; and a step 2 of punching a steel plate body from the strip-like steel plate with a punch portion of a press forming device, and laminating and bonding the steel plate bodies. The manufacturing method of the present invention having such a configuration can simplify manufacturing process, without impairing an adhesion force of an adhesive. In the manufacturing method of the present invention, the oil and the adhesive composition can be simultaneously applied in the form of a mixture without separation, and both performance of the oil and performance of the adhesive composition can be effectively exhibited.

Hereinafter, a manufacturing apparatus used in the method of manufacturing a laminated steel plate of the present invention, each step of the manufacturing method, a laminated steel plate obtained by the manufacturing method, a motor using the same, and an adhesive composition for a laminated steel plate used in the manufacturing method are described in detail.

Apparatus for Manufacturing Laminated Steel Plate

As illustrated in FIG. 1, an apparatus for manufacturing a laminated steel plate 1 is configured to include a roll device 3 for feeding a strip-like steel plate 2 in the direction of a press forming device 4, a coating device 5 for applying a mixture of oil and an adhesive composition to the strip-like steel plate 2, and the press forming device 4. The press forming device 4 is configured to include a punching punch portion 7 that punches out a part of a steel plate body, such as a slot or an inner diameter, from the strip-like steel plate 2 and a pressing punch portion 9 that punches and presses an outer diameter part of the steel plate body from the strip-like steel plate 2, a storage holding hole 6 of the laminated steel plate which is provided immediately under the pressing punch portion 9, and in which the punched and pressed steel plate bodies are laminated and bonded until the number of steel plates reaches a predetermined number to be stored and held, and a bottom 11 of the press forming device. The thickness of the strip-like steel plate 2 is preferably in the range of 0.05 to 5.0 mm, and more preferably 0.1 to 3 mm, from the viewpoint of punching processability.

In the present invention, the punch portion serves to punch and press the strip-like steel plate 2 to laminate. The punching and pressing may be performed using the same punch member or may be performed using two or more punch members. In a case of the apparatus for manufacturing a laminated steel plate 1 illustrated in FIG. 1, the punching punch portion 7 punches out a part of the steel plate body, such as the slot or the inner diameter, from the strip-like steel plate 2, and the pressing punch portion 9 not only punches out the outer diameter of the steel plate body from the strip-like steel plate 2 but also performs the pressing thereon.

Manufacturing Steps

The manufacturing steps of the laminated steel plate include, as illustrated in FIG. 1, a step 1 of applying, by the coating device 5, a mixture of an oil and an adhesive composition to one side or both sides of the strip-like steel plate 2 which is supplied from the roll device 3 and fed in the direction of the press forming device 4, and a step 2 of punching the strip-like steel plate 2 with a press-pressurizing punch 9 after performing punching with the punching punch portion 7 in the press forming device 4, and sequentially laminating (laminating and bonding) and storing a steel plate body on the steel plate bodies (laminated steel plates that have not reached a predetermined number of plates) that have already been laminated in the storage holding hole 6. As described above, since the punching oil and the adhesive composition can be applied simultaneously, the manufacturing process can be simplified. In addition, in a case of applying the mixture of the oil and the adhesive composition on both sides of a strip-like steel plate, the coating device 5 of FIG. 1 may be installed on both an upper side and a lower side of the strip-like steel plate 2. Further, the surface of each of the punch portions 7 and 9 in contact with the strip-like steel plate 2 may be subjected to a surface treatment to prevent adhesion of the mixture of the oil and the adhesive composition applied to the surface of the strip-like steel plate 2. In a case where the mixture of the oil and the adhesive composition is applied to both sides of the strip-like steel plate, the same surface treatment as described above may be performed on at least a part of a transport line in contact with the strip-like steel plate 2.

A method of laminating the steel plate in step 2 may be a method of pressing the steel plate body on the bottom 11 of the press forming device on which the steel plate body is not placed, one steel plate body is already placed, or a plurality of steel plate bodies are laminated, with the pressing pressure of press-pressurizing punch 9, or a method of simply placing the steel plate body without pressing. In addition, the punched steel plate body may be immediately laminated on the bottom 11 of the press forming device on which the steel plate body is not placed, one steel plate body is already placed, or a plurality of steel plate bodies are laminated, or may be laminated after a predetermined time. The already placed one steel plate body or the plurality of laminated steel plate bodies means a laminate obtained by carrying out an operation of pressing the steel plate body by the pressing pressure of the punch 9 or placing on without pressing one or more times. The term "laminating and bonding" means to obtain a laminate by curing or drying the adhesive composition. In step 2, the punched steel plate bodies may be sequentially laminated (laminated and bonded) in the storage holding hole 6 provided immediately below the punch portion 9, and pressed with the punch portion 9 when the number of plates reaches a predetermined number of plates to form a laminated steel plate 8.

Although one punching punch portion 7 is provided in FIG. 1, for example, in a case of a rotor core, a plurality of punching punch portions such as a punching punch portion for the slot part and a punching punch portion for the inner diameter part can be provided to increase punching accuracy. In addition, since the production efficiency can be enhanced, the width of the strip-like steel plate 2 is expanded, and a plurality of punch portions 7 and 9, the storage holding holes 6, and the like are arranged in the width direction of the strip-like steel plate 2, and a line for forming a plurality of the laminated steel plates 8 simultaneously can be formed. The punched shape, that is, the shape of the steel plate body to be punched, in the case of manufacturing the laminated steel plate of the motor, may be a shape such as a slot and a tooth for the strip-like steel plate 2.

Furthermore, in order to cure the adhesive composition between the obtained laminated steel plates in a short time, it is preferable to perform heating. According to the manufacturing steps of the present invention, the mixture of the oil and the adhesive composition between steel plate members can be cured and fixed without providing a degreasing step.

Although a method of heating is not particularly limited, a thermostat, far-infrared heater, and the like are mentioned. The temperature and time for heating may be any conditions that allow sufficient curing, for example, it is appropriate to heat under the conditions of the temperature of 40° C. to 300° C., preferably 60° C. to 200° C., and particularly preferably 80° C. to 150° C., and the time of 10 seconds to 3 hours, preferably 20 seconds to 60 minutes, and particularly preferably 30 seconds to 30 minutes. When putting a laminated steel plate in a thermostat, it is preferable to fix the laminated steel plate with a fixing jig or the like so that positional deviation can be prevented. It is also possible to accelerate the curing of the adhesive composition by installing a heater in the lower portion 10 of the press device in FIG. 1.

A coating method in the coating device 5 is not particularly limited, and examples thereof include a roller, dispensing, spray, ink jet, dipping and the like.

Mixture Containing Oil and Adhesive Composition

A mixture containing the oil and the adhesive composition of step 1 of the present invention is described. By using the mixture containing the oil and the adhesive composition of the present invention, the mixture of the oil and the adhesive composition between the steel plate members (steel plate bodies) can be cured and fixed without providing a degreasing step.

The oil is used to prevent galling and burning, and examples thereof include punching oil and the like. The components of the oil are not particularly limited, and examples thereof include those having a mineral oil or a synthetic oil as a main component, and may further contain a rust inhibitor, an antiseptic agent, and the like as an optional component. In the related art, in order to apply the adhesive composition to the entire steel plate, it was necessary to devise such as making air holes in the steel plate, which was difficult. However, the mixture containing the oil and the adhesive composition has a low viscosity, and thus coating can be easily performed on the entire steel plate.

The adhesive composition is not particularly limited, and examples thereof include a composition containing at least one kind of a (meth)acrylate compound and an organic peroxide, a composition containing an epoxy resin, a composition containing a urethane resin, a composition containing a urea resin, a composition containing a silicone resin, a composition containing a fluorine resin, a composition containing a cyanate ester resin, a composition containing a phenol resin, a composition containing a resorcinol resin, a composition containing a polyamide resin, and the like. Among them, the composition containing at least one kind of a(meth)acrylate compound and an organic peroxide is preferable because it has excellent adhesion force even when used in combination with oil. Particularly preferably, from the viewpoint of that the adhesive composition can be cured in a short time so as to obtain a highly reliable laminated steel plate, the composition containing at least one kind of a (meth)acrylate compound and an organic peroxide is an adhesive composition that can be cured by heating.

The (meth)acrylate compound is preferably at least one kind of a (meth)acrylate compound compatible with the oil, from the viewpoint that the composition does not become cloudy or separated. Examples of the (meth)acrylate compound compatible with the oil include at least one compound selected from the group consisting of an aliphatic (meth) acrylate and an alicyclic (meth)acrylate, and the like. In particular, it is preferable to use at least one compound selected from the group consisting of an aliphatic (meth) acrylate and an alicyclic (meth)acrylate, because when the punching oil and the adhesive are simultaneously applied, the adhesion force of the adhesive is excellent. As the (meth)acrylate compound, in particular, it is particularly preferable to use the (meth)acrylate compound compatible with the oil and the (meth)acrylate compound incompatible with the oil in combination, because the adhesion force can be enhanced. In a case where the (meth)acrylate compound compatible with the oil and the (meth)acrylate compound incompatible with the oil are used in combination, the compounding ratio of the (meth)acrylate compound compatible with the oil is in a range of 20 to 99 parts by mass, and more preferably in the range of 40 to 95 parts by mass per 100 parts by mass of the total amount of the (meth) acrylate compound compatible with the oil and the (meth) acrylate compound incompatible with the oil. Within the above range, it is possible to exhibit particularly excellent adhesion force.

The alicyclic (meth)acrylate is not particularly limited, and examples thereof include dicyclopentanyl (meth)acrylate, dicyclopentenyl oxyethyl (meth)acrylate, tricyclodecane dimethanol di(meth)acrylate, isobornyl (meth)acrylate, cyclohexyl (meth)acrylate, 2-ethylhexyl (meth)acrylate, and the like. The aliphatic (meth)acrylate is not particularly limited, and examples thereof include isostearyl (meth) acrylate, isononyl (meth)acrylate, 1,6-hexanediol di(meth) acrylate, neopentyl di(meth)acrylate, and the like. These may be used alone or two or more kinds thereof may be used in combination.

Examples of the (meth)acrylate compound incompatible with the oil include polyethylene glycol di(meth)acrylate, alkoxylated bisphenol A di(meth)acrylate, 2-(meth)acryloyloxyethyl acid phosphate, hydroxyethyl (meth)acrylate, 2-hydroxy-3-phenoxypropyl (meth)acrylate, dimethyl acrylamide, phenoxyethyl (meth)acrylate, and the like. These may be used alone or two or more kinds thereof may be used in combination.

As the organic peroxide, an organic peroxide having a one-hour half-life temperature in the range of 80° C. to 300° C. is preferable, and an organic peroxide having a one-hour half-life temperature in the range of 100° C. to 200° C. is more preferable from the viewpoint that the adhesive can be cured in a short time and a highly reliable laminated steel plate can be obtained. The above one-hour half-life temperature is a value measured by thermal decomposition in benzene under the condition of a peroxide concentration of 0.1 mol/L.

Examples of the organic peroxide having a one-hour half-life temperature in the range of 80° C. to 300° C. include a hydroperoxide. Specific examples of the hydroperoxide include p-menthane hydroperoxide, diisopropyl benzene hydroperoxide, 1,1,3,3-tetramethyl butyl hydroperoxide, cumene hydroperoxide, t-butyl hydroperoxide, and the like, but the examples are not limited thereto. These may be used alone or two or more kinds thereof may be used in combination.

The addition amount of the organic peroxide is in the range of 0.05 to 10 parts by mass, preferably in the range of 0.1 to 5 parts by mass per 100 parts by mass of the (meth)acrylate compound. Within the above range, it is possible to exhibit more excellent adhesion force.

The addition amount of the mixture is in a range of 3 to 100 parts by mass of the oil, more preferably 5 to 80 parts by mass of the oil, and particularly preferably 10 to 70 parts by mass of the oil, per 100 parts by mass of the adhesive composition. Within the above range, the steel plate bodies are strongly bonded to each other, and thus a highly reliable laminated steel plate can be obtained.

Optional Component in Adhesive Composition

An elastomer component can be added to the adhesive composition of the present invention for the purpose of improving strength and the like. In addition, a chelating agent, an antioxidant, a radical polymerization inhibitor, and the like can be added to improve the storage stability. In addition, a viscosity (rheology) modifier can be added for the purpose of adjusting the viscosity. In addition, a polymerization rate modifier such as a thiol and an amine compound can be added.

As a matter of course, the mixture of the present invention may contain optional components in the above-mentioned adhesive composition.

Strip-Like Steel Plate

As the strip-like steel plate of the present invention, a steel plate distributed as a product in a rolled-up state can be used. In the present invention, such a steel plate can be used as it is without degreasing. As a kind of the strip-like steel plate, an iron steel plate (cold rolled steel or the like), an electromagnetic steel plate, and the like can be used.

Steel Plate Body

The steel plate body of the present invention is obtained by punching out a strip-like steel plate coated with the adhesive composition into a predetermined shape. The thickness of the steel plate body is preferably 0.01 to 3 mm, and more preferably 0.1 to 1 mm, from the aspect that the needs for further thinning of the laminated steel plate are increasing with the miniaturization of the motor. In addition, the thickness of the adhesive layer applied and formed on the steel plate body is preferably 0.1 to 1000 μm and more preferably 0.5 to 500 μm from the same needs. Further, the number of steel plate bodies used for the laminated steel plate is preferably 2 to 500, and more preferably 3 to 50, from the viewpoint of excellent motor efficiency.

The laminated steel plate obtained by the method of manufacturing a laminated steel plate of the present invention is preferably used for a rotor or a stator of a motor. With this configuration, the process can be greatly simplified because the oil (punching oil or the like) and the adhesive composition can be applied simultaneously. In addition, it is possible to provide a highly efficient laminated steel plate which is extremely thin for a rotor or a stator which does not cause stress concentration or strain concentration and is excellent in cost reduction effect.

Laminated Steel Plate

Since the laminated steel plate obtained by the manufacturing method of the present invention is insulated by the adhesive composition (adhesive layer), there is little current loss and high performance, stress is dispersed on the surface, and stress concentration and strain concentration do not occur. From this aspect, the laminated steel plate is preferably used for the rotor or the stator of the motor, or the like.

Motor

The motor using the laminated steel plate obtained by the manufacturing method of the present invention for a rotor, a stator, or the like is suitably used for vibration of a mobile phone, focus adjustment of a camera, driving of a hard disk, driving of a car, and the like. The motor having such a configuration has low current loss and is excellent in efficiency.

EXAMPLES

The present invention is specifically described below by way of examples, but the present invention is not limited by the following examples.

15 parts by mass of various monomers in Table 1, 0.2 parts by mass of cumene hydroperoxide, and 5 parts by mass of oil (mineral oil, G6339F manufactured by Nihon Kohsakuyu Co., Ltd.) were mixed for 60 minutes at normal temperature for preparation. The presence or absence of compatibility was visually confirmed and evaluated. The results are indicated in Table 1. "Compatible" means that the composition is transparent, and "not compatible" means that the composition becomes cloudy and separated.

TABLE 1

| | Monomer | | Presence or absence of |
|---|---|---|---|
| | Name of compounds | Name of raw materials | compatibility |
| Mixture 1 | Dicyclopentanyl methacrylate | FA-513MS manufactured by Hitachi Chemical Co., Ltd. | Compatible |
| Mixture 2 | Dicyclopentanyl acrylate | FA-513AS manufactured by Hitachi Chemical Co., Ltd. | Compatible |
| Mixture 3 | Dicyclopentenyl oxyethyl acrylate | FA-512AS manufactured by Hitachi Chemical Co., Ltd. | Compatible |
| Mixture 4 | Cyclopentenyl oxyethyl methacrylate | FA-512M manufactured by Hitachi Chemical Co., Ltd. | Compatible |
| Mixture 5 | Tricyclodecane dimethanol dimethacrylate | DCP manufactured by SHIN-NAKAMURA CHEMICAL CO., LTD. | Compatible |
| Mixture 6 | Isobornyl acrylate | IBX-A manufactured by KYOEISHA CHEMICAL Co., Ltd. | Compatible |
| Mixture 7 | Isobornyl methacrylate | IBX manufactured by KYOEISHA CHEMICAL Co., Ltd. | Compatible |
| Mixture 8 | Cyclohexyl acrylate | CHA#155 manufactured by OSAKA ORGANIC CHEMICAL INDUSTRY LTD. | Compatible |
| Mixture 9 | Tetrahydrofurfuryl acrylate | THFA manufactured by OSAKA ORGANIC CHEMICAL INDUSTRY LTD. | Compatible |
| Mixture 10 | 2-ethylhexyl methacrylate | EH manufactured by KYOEISHA CHEMICAL Co., Ltd. | Compatible |
| Mixture 11 | Isostearyl acrylate | S-1800A manufactured by SHIN-NAKAMURA CHEMICAL CO., LTD. | Compatible |
| Mixture 12 | Isononyl acrylate | INAA manufactured by OSAKA ORGANIC CHEMICAL INDUSTRY LTD. | Compatible |
| Mixture 13 | Trimethylolpropane trimethacrylate | TMPT manufactured by SHIN-NAKAMURA CHEMICAL CO., LTD. | Compatible |
| Mixture 14 | 1,6-hexanediol diacrylate | HDDA manufactured by OSAKA ORGANIC CHEMICAL INDUSTRY LTD. | Compatible |

TABLE 1-continued

| | Monomer | | Presence or absence of compatibility |
|---|---|---|---|
| | Name of compounds | Name of raw materials | |
| Mixture 15 | Neopentyl glycol dimethacrylate | NPG manufactured by SHIN-NAKAMURA CHEMICAL CO., LTD. | Compatible |
| Mixture 16 | Ethylene glycol dimethacrylate | 1G manufactured by SHIN-NAKAMURA CHEMICAL CO., LTD. | Compatible |
| Mixture 17 | Polyethylene glycol #400 dimethacrylate | 9G manufactured by SHIN-NAKAMURA CHEMICAL CO., LTD. | Not compatible |
| Mixture18 | Ethoxylated bisphenol A dimethacrylate | BPE-100N manufactured by SHIN-NAKAMURA CHEMICAL CO., LTD. | Not compatible |
| Mixture 19 | 2-methacryloyloxyethyl acid phosphate | P-2M manufactured by KYOEISHA CHEMICAL Co., Ltd. | Not compatible |
| Mixture 20 | 2-hydroxyethyl methacrylate | HO-250 (N) manufactured by KYOEISHA CHEMICAL Co., Ltd. | Not compatible |
| Mixture 21 | 2-hydroxy-3-phenoxypropyl acrylate | M-600A manufactured by KYOEISHA CHEMICAL Co., Ltd. | Not compatible |
| Mixture 22 | Dimethyl acrylamide | DMAA manufactured by KJ Chemicals Corporation | Not compatible |
| Mixture 23 | Phenoxyethyl acrylate | PO-A manufactured by KYOEISHA CHEMICAL Co., Ltd. | Not compatible |

Preparation of Mixture Containing Oil and Adhesive Composition

Example 1

An adhesive composition containing 80 parts by mass of isobornyl acrylate (a (meth)acrylate compound compatible with oil, IBX-A manufactured by Kyoeisha Chemical Co., Ltd.), 20 parts by mass of ethoxylated bisphenol A dimethacrylate (a (meth)acrylate compound incompatible with oil, BPE 2.6 manufactured by Shin-Nakamura Chemical Co., Ltd.), and 2 parts by mass of cumene hydroperoxide (organic peroxide having a one-hour half-life temperature of 157.9° C., manufactured by NOF Corporation) was mixed for 60 minutes with a mixer at normal temperature, then 43 parts by mass of punching oil (mineral oil, G6339F manufactured by Nihon Kohsakuyu Co., Ltd.) was added and mixed for 30 minutes with a mixer at normal temperature so as to prepare a mixture containing the oil and the adhesive composition of this example.

Example 2

A mixture containing the oil and the adhesive composition of the present example was prepared in the same method as that in Example 1 except that tricyclodecane dimethanol dimethacrylate (a (meth)acrylate compound compatible with oil, DCP, manufactured by Shin-Nakamura Chemical Co., Ltd.) was used in place of isobornyl acrylate in Example 1.

Example 3

A mixture containing the oil and the adhesive composition of the present example was prepared in the same method as that in Example 1 except that neopentyl dimethacrylate (a (meth)acrylate compound compatible with oil, NPG, manufactured by Shin-Nakamura Chemical Co., Ltd.) was used in place of isobornyl acrylate in Example 1.

Example 4

A mixture containing the oil and the adhesive composition of the present example was prepared in the same method as that in Example 1 except that trimethylolpropane trimethacrylate (a (meth)acrylate compound compatible with oil, TMPT, manufactured by Shin-Nakamura Chemical Co., Ltd.) was used in place of isobornyl acrylate in Example 1.

Example 5

A mixture containing the oil and the adhesive composition of the present example was prepared in the same method as in Example 2 except that 43 parts by mass of oil was changed to 34 parts by mass in Example 2.

Example 6

A mixture containing the oil and the adhesive composition of the present example was prepared in the same method as in Example 2 except that 43 parts by mass of oil was changed to 68 parts by mass in Example 2.

Comparative Example 1

An oil of Comparative Example 1 composed only of punching oil (mineral oil, G6339F manufactured by Nihon Kohsakuyu Co., Ltd.) was obtained.

Reference Example 1

A mixture containing the oil and the adhesive composition of the present reference example was prepared in the same method as in Example 1 except that isobornyl acrylate was removed in Example 1.

Tensile Shear Adhesion Strength Test

Each mixture containing each oil and adhesive composition prepared in each example and the oil of Comparative Example 1 was applied on overlapping surfaces of 10 mm of two test pieces of iron steel plate or electromagnetic steel plate of 25 mm wide×100 mm long×3 mm thick and adhering was performed, and heating and curing were performed for 60 minutes in a thermostat set at 120° C., and thereby each test piece was obtained. Next, using each test piece, shear adhesion strength (unit: MPa) was measured according to JIS K 6850 (1999) with a universal tensile tester (tensile speed 10 mm/min) at 25° C. The results are indicated in Table 2. In the present invention, the shear adhesion strength is preferably 0.5 MPa or more, and particularly preferably 1 MPa or more. The mixture containing the oil and the adhesive composition prepared in Reference Example 1 is not indicated in Table 2 because it was separated before application and could not be applied.

TABLE 2

| | Example 1 | Example 2 | Example 3 | Example 4 | Example 5 | Example 6 | Comparative Example 1 |
|---|---|---|---|---|---|---|---|
| Iron steel plate shear (MPa) | 0.9 | 5.3 | 2.3 | 2.5 | 5.2 | 4.7 | 0 |
| Electromagnetic steel plate shear (MPa) | 2.0 | 9.0 | 2.9 | 4.1 | 9.5 | 7.8 | 0 |

From Examples 1 to 6 in Table 2, it can be seen that the mixture containing the oil and the adhesive composition of the present invention has excellent adhesion to iron steel plates or electromagnetic steel plates. With this, by using the mixture containing the oil and the adhesive composition of the present invention, the mixture of the oil and the adhesive composition between the steel plate members can be cured and fixed without providing a degreasing step. On the other hand, according to Comparative Example 1, it can be seen that since the adhesive composition component of the present invention is not contained, and the steel plates are not bonded at all.

INDUSTRIAL APPLICABILITY

The present invention is extremely effective and applicable to a wide range of fields to be industrially useful from the fact that it provides a method of manufacturing a laminated steel plate which can simplify the process because the oil and the adhesive composition can be simultaneously applied.

This application is based on Japanese Patent Application No. 2017-101758 filed on May 23, 2017, the disclosure of which is incorporated in its entirety by reference.

REFERENCE SIGNS LIST 1 apparatus for manufacturing laminated steel plate
2 strip-like steel plate
3 roller device
4 press forming device
5 coating device for mixture containing oil and adhesive composition
6 storage holding hole for laminated steel plate
7 punching punch portion
8 steel plate lamination
9 press-pressurizing punch portion
10 lower portion of press forming device
11 bottom

The invention claimed is:

1. A method of manufacturing a laminated steel plate operatively associated with a press forming device, comprising:
applying a mixture containing an oil and an adhesive composition for the laminated steel plate to at least one side of both sides of a strip steel plate;
punching a steel plate body from the strip steel plate with a punch portion of the press forming device, and repeating the punching the steel plate body to form a plurality of steel bodies; and
laminating and bonding the plurality of the steel plate bodies;
wherein in the applying the mixture, simultaneously applying the oil and the adhesive composition to the at least one side of both sides of the strip steel plate;
wherein the applying the mixture further comprises applying the adhesive composition containing at least one (meth)acrylate compound and an organic peroxide,
the at least one (meth)acrylate compound comprises at least one (meth)acrylate compound compatible with the oil, and
the at least one (meth)acrylate compound compatible with the oil comprises at least one selected from the group consisting of dicyclopentanyl (meth)acrylate, dicyclopentenyl oxyethyl (meth)acrylate, tricyclodecane dimethanol di(meth)acrylate, isobornyl (meth)acrylate, cyclohexyl (meth)acrylate, 2 ethylhexyl (meth)acrylate, isostearyl (meth)acrylate, isononyl (meth)acrylate, 1,6-hexanediol di(meth)acrylate, neopentyl di(meth)acrylate and trimethylolpropane trimethacrylate;
wherein the bonding the plurality of the steel plate bodies comprises curing the adhesive composition by heating.

2. The method of manufacturing a laminated steel plate according to claim 1, wherein in the applying of the mixture, the at least one (meth)acrylate compound further comprises at least one (meth)acrylate compound incompatible with the oil.

3. The method of manufacturing a laminated steel plate according to claim 2, wherein in the applying the mixture, the (meth)acrylate compound incompatible with the oil comprises at least one selected from the group consisting of polyethylene glycol di(meth)acrylate, alkoxylated bisphenol A di(meth)acrylate, 2-(meth)acryloyloxyethyl acid phosphate, hydroxyethyl (meth)acrylate, 2-hydroxy-3-phenoxypropyl (meth)acrylate, dimethyl acrylamide, and phenoxyethyl (meth)acrylate.

4. The method of manufacturing a laminated steel plate according to claim 1, wherein in the applying of the mixture, applying the mixture containing 3 to 100 parts by mass of the oil per 100 parts by mass of the adhesive composition.

5. The method of manufacturing a laminated steel plate according to claim 1, wherein in the applying the mixture, the at least one (meth)acrylate compound compatible with the oil is at least one selected from the group consisting of tricyclodecanedimethanol di(meth)acrylate, neopentyl di(meth)acrylate, and trimethylolpropane trimethacrylate.

6. The method of manufacturing a laminated steel plate according to claim 1, wherein the applying the mixture comprises applying a punching oil.

7. A method of manufacturing a rotor of a motor, comprising manufacturing a laminated steel plate, comprising:
applying a mixture containing an oil and an adhesive composition for the laminated steel plate to at least one side of both sides of a strip steel plate;
punching a steel plate body from the strip steel plate with a punch portion of the press forming device, and repeating the punching the steel plate body to form a plurality of steel bodies; and
laminating and bonding the plurality of the steel plate bodies;
wherein in the applying the mixture, simultaneously applying the oil and the adhesive composition to the at least one side of both sides of the strip steel plate;
wherein the applying the mixture further comprises applying the adhesive composition containing at least one (meth)acrylate compound and an organic peroxide,
the at least one (meth)acrylate compound comprises at least one (meth)acrylate compound compatible with the oil, and
the at least one (meth)acrylate compound compatible with the oil comprises at least one selected from the group consisting of dicyclopentanyl (meth)acrylate, dicyclopentenyl oxyethyl (meth)acrylate, tricyclodecane dimethanol di(meth)acrylate, isobornyl (meth)acrylate, cyclohexyl (meth)acrylate, 2-ethylhexyl (meth)acrylate, isostearyl (meth)acrylate, isononyl (meth)acrylate, 1,6-hexanediol di(meth)acrylate, neopentyl di(meth)acrylate, and trimethylolpropane trimethacrylate;
wherein the bonding the plurality of the steel plate bodies comprises curing the adhesive composition by heating;
manufacturing the rotor of the motor using the laminated steel plate; and
assembling the rotor of the motor comprising the laminated steel plate.

8. A method of manufacturing a stator of a motor, comprising manufacturing a laminated steel plate, comprising:
applying a mixture containing an oil and an adhesive composition for the laminated steel plate to at least one side of both sides of a strip steel plate;
punching a steel plate body from the strip steel plate with a punch portion of the press forming device, and repeating the punching the steel plate body to form a plurality of steel bodies; and
laminating and bonding the plurality of the steel plate bodies;
wherein in the applying the mixture, simultaneously applying the oil and the adhesive composition to the at least one side of both sides of the strip steel plate;
wherein the applying the mixture further comprises applying the adhesive composition containing at least one (meth)acrylate compound and an organic peroxide,
the at least one (meth)acrylate compound comprises at least one (meth)acrylate compound compatible with the oil, and
the at least one (meth)acrylate compound compatible with the oil comprises at least one selected from the group consisting of dicyclopentanyl (meth)acrylate, dicyclopentenyl oxyethyl (meth)acrylate, tricyclodecane dimethanol di(meth)acrylate, isobornyl (meth)acrylate, cyclohexyl (meth)acrylate, 2-ethylhexyl (meth)acrylate, isostearyl (meth)acrylate, isononyl (meth)acrylate, 1,6-hexanediol di(meth)acrylate, neopentyl di(meth)acrylate, and trimethylolpropane trimethacrylate;
wherein the bonding the plurality of the steel plate bodies comprises curing the adhesive composition by heating;
manufacturing the stator of the motor using the laminated steel plate; and
assembling the stator of the motor comprising the laminated steel plate.

* * * * *